Nov. 19, 1963 E. P. SKOV ETAL 3,111,635
METHOD AND APPARATUS FOR ELIMINATING OVERLOADING
IN MODULATING SYSTEMS HAVING PRE-EMPHASIS MEANS
Filed May 5, 1960 2 Sheets-Sheet 1

INVENTORS
ERLING P. SKOV
REIN NARMA
BY Darby + Darby
ATTORNEYS

INVENTORS
ERLING P. SKOV
REIN NARMA
BY
Darby & Darby
ATTORNEYS

United States Patent Office 3,111,635
Patented Nov. 19, 1963

3,111,635

METHOD AND APPARATUS FOR ELIMINATING OVERLOADING IN MODULATING SYSTEMS HAVING PRE-EMPHASIS MEANS

Erling P. Skov, Briarwood, N.Y., and Rein Narma, Woodside, Calif., assignors to Fairchild Recording Equipment Corporation, Long Island City, N.Y., a corporation of New York Filed May 5, 1960, Ser. No. 27,208
11 Claims. (Cl. 333—14)

This invention relates to modulating systems such as recording systems for phonograph records and the like, and more particularly to a method and apparatus for eliminating overload and distortion caused by the use of pre-emphasis means in such systems.

In the usual recording system for phonograph records and the like, the subject matter to be recorded is converted into corresponding electric signals which are used to drive a cutting head to modulate or "cut" a record blank. The signals employed to drive the cutting head may be obtained directly from a microphone, or, as is the usual practice, may be obtained from a master tape recording. During the actual cutting operation, a so-called "RIAA" equalizer is employed in the cutting system to attenuate the amplitude of the low frequency components of the signal to be recorded to prevent unduly large movements of the cutting stylus. The RIAA equalizer also functions as a "pre-emphasis" network to pre-emphasize or "boost" the amplitudes of the range of high frequency components of the signal to be recorded with respect to the amplitudes of the mid-frequency components of the signal. As is well known, this is done to provide a higher signal to noise ratio for the high frequency components to enable them to "override" record groove noise. When playing back the recorded material, a de-emphasis network is utilized in the reproducing equipment to restore the normal frequency balance of the frequency components of the recorded signals.

The pre-emphasis function of the RIAA equalizer, while solving the problem of record groove noise, presents another problem in that the high level, high frequency components of the signal to be recorded which have been boosted in amplitude relative to the mid-frequency components tend to overload the amplifiers and other components of the system, to thereby produce distortion. A number of attempts have been made to solve the problem of overloading caused by the use of pre-emphasis in recording systems for phonograph records and the like. One attempted solution involves the use of a manually operated level control to reduce the sharp high-amplitude peaks of the high frequency components to a safe level which does not produce overloading. Obviously, this solution is not the most desirable because it requires the use of a specially trained operator. Another attempted solution makes use of a filter network to attenuate the amplitude of the high frequency components of the signal to be recorded. Unfortunately, this method is unsatisfactory because the filter attenuates not only the high level, high frequency components, but also the low level, high frequency components of the signal to be recorded, with the result that poor tonal balance of the recorded signal may be obtained.

Accordingly, it is an object of this invention to provide an automatic filter for use in recording systems and the like of the type employing pre-emphasis means, which filter operates automatically to limit the amplitude of the high level components of the pre-emphasized range of frequencies of the signal to be recorded, without modifying the remaining frequency components of the signal or the low level components of the pre-emphasized range.

It is a further object of this invention to provide an automatic filter for recording systems of the type described herein, which filter has an exceptionally fast attack time and operates to attenuate only those high frequency components of the signal to be recorded having an amplitude above a predetermined level when pre-emphasized.

It is a still further object of this invention to provide a method and apparatus for eliminating overloading caused by the use of pre-emphasis in modulating systems, such as radio broadcasting systems and recording systems for phonograph records and the like.

Briefly, the automatic filter of the invention functions to simulate the effect of the pre-emphasis of the RIAA equalizer on the signals to be recorded and to limit only those high frequency components of the pre-emphasized range of frequencies having an amplitude exceeding a predetermined level. By limiting the amplitude of the high-level, high frequency components of the signal to be recorded prior to the introduction of the signal to the RIAA equalizer network, distortion due to overloading of the amplifiers and other components of the system is eliminated. In order to accomplish this, the filter of the invention provides means for dividing the signal to be recorded into at least two portions, each containing all of the frequencies of the signal to be recorded. Each portion of the signal is then applied to a separate channel of the filter. In the first channel, one signal portion is passed through a high pass equalizer or filter network which boosts the amplitudes of the high frequencies relative to the amplitudes of the mid-frequencies to simulate the pre-emphasis curve of the RIAA equalizer network. The high pass filter also attenuates the lower frequency components to substantially eliminate them and pass only the pre-emphasized range of high frequencies. The pre-emphasized high frequency components of the signal are then applied to a limiter in the form of a "clipper" circuit which acts to clip or limit those high frequency components having an amplitude above a predetermined safe level. The clipped signals are then applied to a low pass equalizer or filter which acts to de-emphasize the high frequency components of the signal at substantially the same rate as the simulated pre-emphasis of the high pass filter. The de-emphasized high frequencies are then filtered to remove the harmonics and intermodulation products produced by the clipping operation. The output of the first channel, which consists then of the high frequency components of the signal to be recorded clipped to a safe level, is applied to a combining network. The second channel of the filter, which receives the other portion of the signal to be recorded, functions to pass only the low frequency components of the signal to the combining network. This is accomplished by the use of a low pass equalizer or filter which attenuates the high frequency components. The combining network then adds the outputs of the two channels to reconstitute or "recreate" the applied input signal to be recorded. If desired, an amplifier may be utilized to boost the level of the output signal from the combining network before the signal is introduced into the RIAA equalizer network in the cutting system to compensate for filter insertion loss. By virtue of this arrangement, the filter of the invention eliminates the unwanted high peaks of the high frequency components of the signal to be recorded prior to the introduction of the signal to the RIAA equalizer in the cutting system. Since the filter only operates on the high level, high frequency components, it does not modify all of the frequencies in the signal to be recorded and does not disturb the relative frequency distribution of the components of the signal. Furthermore, it may be noted that only those high frequency components which are at an unsafe level are attenuated by this means so that the limiting function is accomplished in a manner having very little, if any, effect on the audible output of the system.

In the drawings:

FIG. 1 is a block diagram of a typical recording system for phonograph records and the like;

Figure 1:
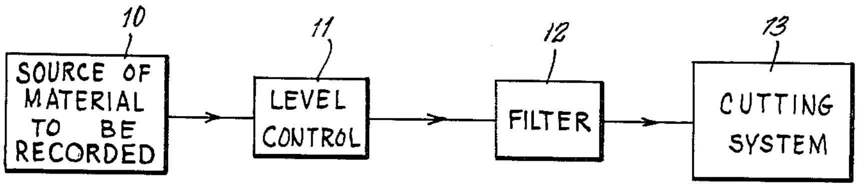

Referring now to FIG. 1 of the drawings, there is shown a recording system for phonograph records and the like comprising a source 10 of material to be recorded. The source 10 may be a microphone or a playback device for a master tape containing the material to be recorded. The source 10 functions to provide electric signals corresponding to the material to be recorded, such as music or speech for example. Since these signals usually have a complex wave form, they may contain frequency components within the audible range from about 20 cycles to 15 kc. The usual practice is to apply these signals to one or more level controllers 11 and filters 12 to limit the amplitude of the various frequency components of the signals and to control the relative proportions of the frequency components of the signals to obtain desired tonal qualities. The output from the level control 11 and filter 12 is applied to a cutting system 13 which performs the actual record cutting or modulating function. The usual cutting system includes a cutting head with associated cutting stylus, a driver amplifier to drive the cutting head, and an RIAA equalizer network which functions to limit the low frequency amplitudes and to pre-emphasize the high frequency components. The RIAA equalizer network is standardized throughout the record industry and has a frequency response curve having a 75 microsecond portion from about 2 kc. to about 15 kc. The 75 microsecond portion of the frequency response curve serves to boost or pre-emphasize the high frequency components in the range from 2 kc. up to about 15 kc. relative to the mid-frequencies, so that there is a tendency for the high amplitude, high frequency components to overload or saturate the driver amplifier and other components of the cutting system. In the known recording system shown in FIG. 1, the amplitude of the high frequency components may be limited by manually operating the level control 11 or by the use of a frequency selective filter. As explained hereinbefore, the manual control requires the use of a skilled operator, while the known filter arrangements attenuate not only the high level, high frequency components but also the low level, high frequency components and the remaining frequencies of the signal to be recorded.

Figure 2:
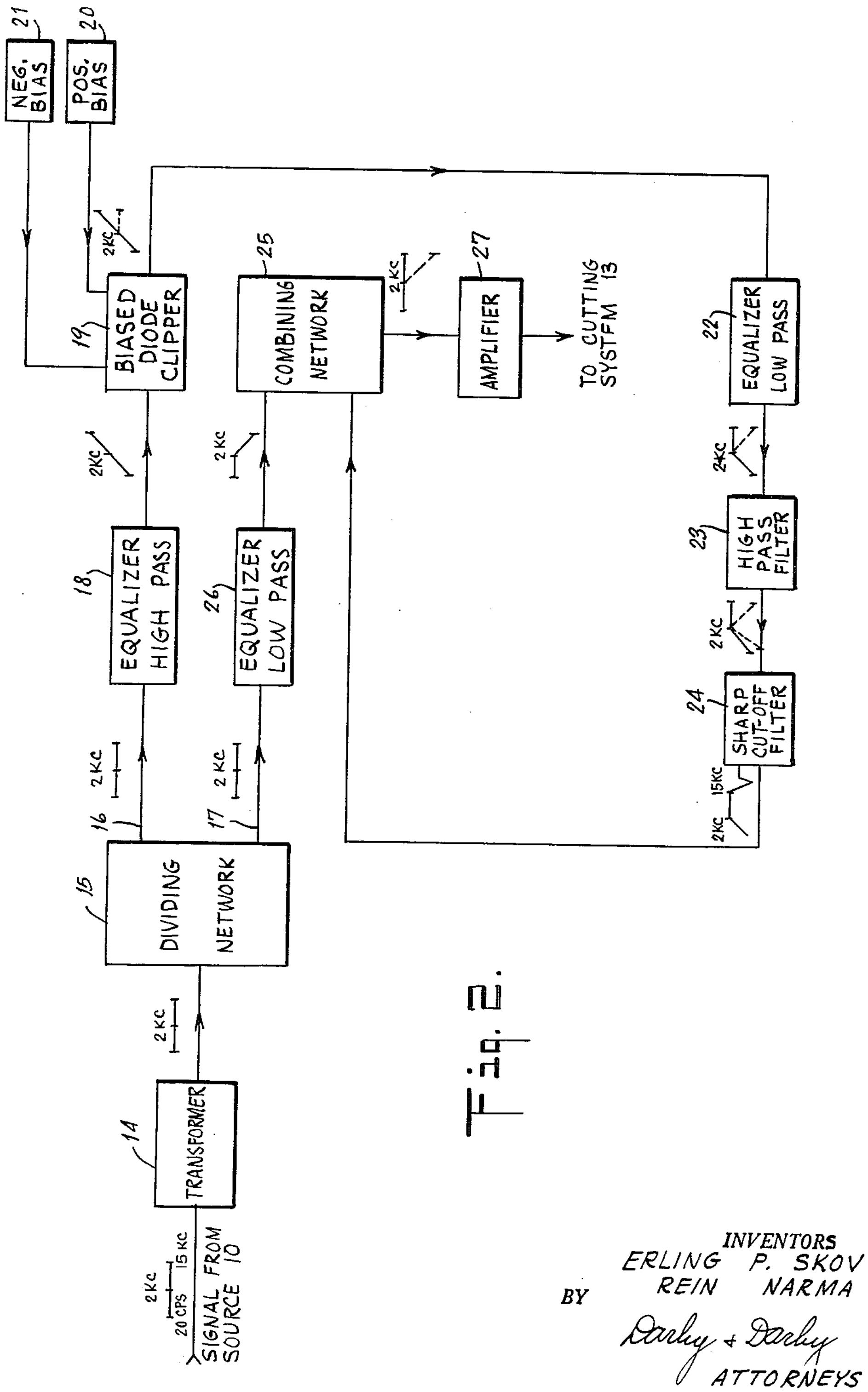
FIG. 2 is a block diagram of the automatic filter of the invention.

The automatic filter of the invention is shown in FIG. 2 of the drawings as comprising a transformer 14 which serves to raise the level of the signal to be recorded from source 10. The output of the transformer is connected to a dividing network 15 which divides the signal into two portions and applies its portions to separate channels 16 and 17. As seen by the frequency response curves at the output side of the dividing network 15 above the lines for the respective channels 16 and 17, each of the signal portions contains the full range of frequencies from 20 cycles to 15 kc. The portion of the signal to channel 16 is applied to the input of a high pass equalizer or filter network 18 which is a 6 db per octave high pass filter (3 db down at 15 kc.). This network boosts the frequencies from 2 kc. to 15 kc. at a 6 db per octave rate similar to the high frequency pre-emphasis portion of the RIAA equalizer curve and attenuates the frequencies below 2 kc. at the same 6 db per octave rate. The output from filter 18 is applied to a biased diode clipper circuit 19 which receives its positive bias voltage from a source 20 and its negative bias voltage from a source 21. By adjusting the bias voltages for the clipper circuit to the required level, only those high frequency components of the signal to be recorded having an amplitude exceeding the set bias level will be clipped. In this case, the frequency response will show a 6 db per octave rolloff at high frequencies. The higher the signal level of the pre-emphasized high frequency components or the lower the bias, the lower the frequency will be at which the rolloff starts, i.e. the frequency at which the attenuation of the signal from filter 18 starts. Since the lower limit for the rolloff frequency is 2 kc., if all frequencies of the signal exceed the threshold value of amplitude, the frequency response will be exactly opposite to the RIAA 75 microsecond pre-emphasis curve. The output of the clipper circuit 19 is connected to an equalizer 22 which functions as a 6 db per octave low pass filter (3 db down at 2 kc.). This filter operates to de-emphasize the response curve from 2 kc. to 15 kc. The frequency response curve on the output side of clipper 19 in FIG. 2 of the drawings shows the frequency response from 2 kc. to 15 kc. in solid line when no clipping takes place and in dotted line when clipping occurs.

It should be noted that in the absence of clipping by clipper 19, the low pass filter 22 acts to de-emphasize the frequencies from 2 kc. to 15 kc. to "flatten" the frequency response curve as shown by the solid line curve on the output side of the filter 22 in the drawings. When clipping takes place, the clipper circuit 19 acts to flatten the curve from 2 kc. to 15 kc. so that the low pass filter 22 acts to atenuate the 2 kc. to 15 kc. range of frequencies as shown by the dotted line curve on the output side of the filter 22. When only a portion of the 2 kc. to 15 kc. range is clipped, the frequency response curve varies between the solid line and dotted line illustrated. Since any clipping or limiting operation produces some distortion by virtue of creating higher harmonics and intermodulation products, the output signal from equalizer network 22 is filtered by means of filters 23 and 24 to remove the "spurious" frequency components produced by the limiting. Filter 24 is a sharp high frequency cut-off filter which eliminates the higher harmonics of frequencies above 9–10 kc. and intermodulation products above 18 kc. If desired, an additional sharp high pass filter 23 may be provided, as illustrated, to eliminate the difference frequencies below 2 kc. produced by intermodulation. The filtered signals at the output of filter 24 consist of the high frequency components of the signal to be recorded in the range of about 2 kc. to 15 kc., but with the unwanted high level peaks of the components removed by the clipping process. These signals are applied to a combining network 25.

The other portion of the signal to be recorded from dividing network 15 is applied to channel 17 where it is passed through an equalizer network 26, which functions as a 6 db per octave low pass filter to attenuate the frequencies above 2 kc. at the 6 db per octave rate. By this means, the frequency components below 2 kc. of the signal to be recorded are passed without substantial change to the combining network 25. In the combining network 25, the high frequency components above 2 kc. from channel 16 and the low frequency components below 2 kc. from channel 17 are combined to recreate the full range of signal frequencies. Therefore, the signal at the output of the combining network 25 is essentially the same signal to be recorded as applied to the input of dividing network 15, but with the unwanted high level peaks of the high frequency components eliminated. When the signal to be recorded contains no high level, high frequency components which may cause overloading and no clipping takes place, the output signal from network 25 is flat from 2 kc. to 15 kc. as shown by the solid line in the output curve for network 25. However, should high level, high frequency components be present in the signal to be recorded, the clipping action of clipper circuit 19 causes the output signal from combining network 25 to be correspondingly attenuated from 2 kc. to 15 kc., as shown by the dotted line in the output curve for network 25. Since the high level, high frequency components are attenuated in this manner, they will not rise to unwanted high levels which may cause overloading when they are pre-emphasized by the RIAA equalizer in the cutting system. Finally, if desired, the output of the combining network 25 may be applied to drive the cutting system 13 through an amplifier 27 of any suitable type having the required frequency range, to thereby compensate for the insertion loss of the filter.

Figure 3:
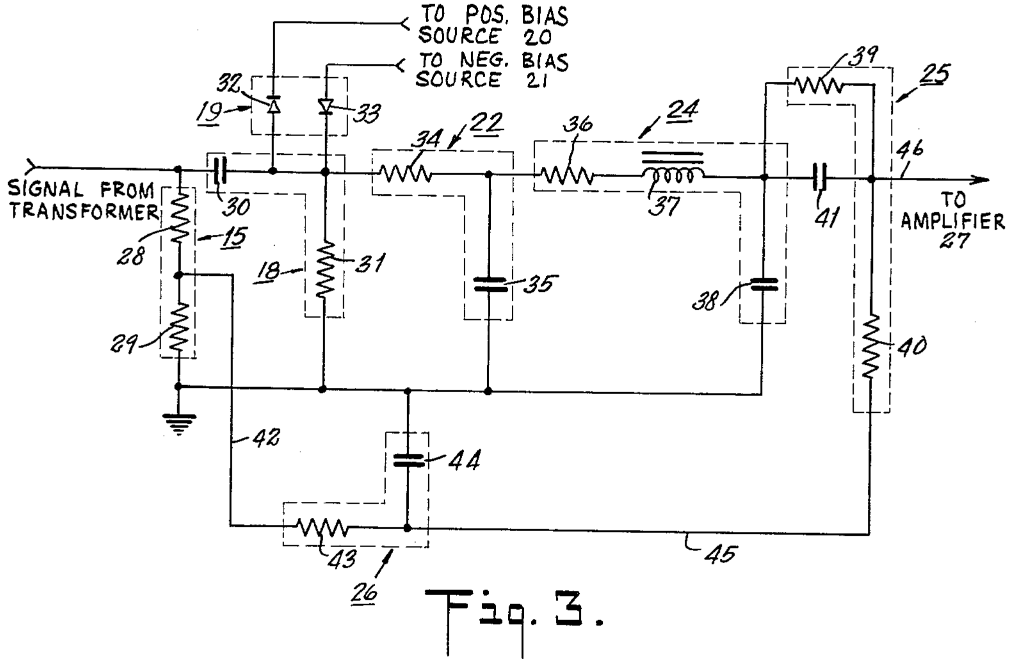
FIG. 3 is a circuit diagram showing a preferred embodiment of the filter of FIG. 2.

FIG. 3 of the drawings illustrates a preferred embodiment of the continuously variable automatic filter which is similar, although not exactly identical, to the filter of FIG. 2. The main differences between the two filters is that the filter of FIG. 3 does not use the high pass filter 23 of FIG. 2. However, the FIG. 3 filter makes use of an additional high pass boost capacitor at the output of the shap cut-off filter 24. In all other respects the two filters are the same. As seen in FIG. 3, the signal from transformer 14 is applied to a dividing network, corresponding to network 15 of FIG. 2, formed by serially-connected resistors 28 and 29. The dotted blocks indicate the same components shown in FIGURE 2 and the same response curves shown in FIGURE 2 appear at the respective outputs of these dotted blocks. Resistors 28 and 29 are essentially a voltage divider wherein the signal for one channel is taken off between ground and the free end of the serially-connected resistors and the signal for the other channel is taken off between ground and the circuit junction of the serially-connected resistors. The signal in the first channel (channel 16 of FIG. 2) is passed through an RC filter formed by capacitor 30 and resistor 31. This filter is the high pass equalizer 18 of FIG. 2 which has the 6 db per octave rate and functions to simulate the 75 microsecond pre-emphasis curve of the RIAA equalizer. The clipping function of circuit 19 of FIG. 2 is performed by diodes 32 and 33 which may be of the semiconductor type. The diodes are reversely biased and oppositely connected to shunt the output from the high pass filter with diode 32 being connected to the positive source of bias voltage 20 and diode 33 being connected to the negative source of bias voltage 21. Preferably, these sources of bias voltage are made variable to permit adjustment of the clipping level to suit various recording conditions. Furthermore, since the diodes 32 and 33 are oppositely connected, they will clip both the positive and negative peaks of the applied signal which exceed the predetermined safe level. The output from the biased diodes is applied to the low pass equalizer network 22 formed by resistor 34 and capacitor 35. Again, by suitably proportioning the circuit values of the resistor and capacitor, the required 6 db per octave de-emphasis rate may be obtained. The output from the low pass filter formed by resistor 34 and capacitor 35 is then applied to the sharp cut-off filter 24 formed by resistor 36, inductance 37 and capacitor 38. As explained previously, this sharp cut-off filter eliminates the higher harmonics of frequencies above 9–10 kc. and the intermodulation products above 18 kc. that are produced by the clipping action. It will be understood that a high pass filter, such as the filter 23, may be included, if desired, to eliminate the difference frequencies below 2 kc. The filtered signals from the first channel are applied to the amplifier 27 through resistor 39 of a combining network formed by resistors 39 and 40. A capacitor 41 is arranged to shunt resistor 39 in this particular design to boost the high frequencies enough to compensate for the action of the sharp cut-off filter employed. By employing other designs for the sharp cut-off filter, the capacitor 41 may be omitted.

The second channel input is obtained by connecting the circuit junction of voltage divider resistors 28 and 29 by a lead 42 to the low pass equalizer network 26 formed by resistor 43 and capacitor 44. Again, by suitably proportioning the circuit values of resistor 43 and capacitor 44, the required 6 db per octave rate of attenuation for the frequencies above 2 kc. may be obtained. The second channel output from the equalizer 26 is connected by a lead 45, the resistor 40 of the combining network and a lead 46 to the input of compensating amplifier 27. Suitable values of circuit components for the circuit of FIG. 3 to provide the preferred filtering rates are as follows:

| Resistors: | Value in ohms |
|---|---|
| 28 | 82K |
| 29 | 11K |
| 31 | 100K |
| 34 | 68K |
| 36 | 82K |
| 39 | 1M |
| 40 | 1M |
| 43 | 100K |

| Capacitors: | | Value in farads |
|---|---|---|
| 30 | mmf | 130 |
| 35 | mmf | 330 |
| 38 | mmf | 110 |
| 41 | mmf | 20 |
| 44 | mmf | 820 |

| Inductors: | | Value in henrys |
|---|---|---|
| 37 | mh | 500 |

While the automatic filter of the invention finds particular application in recording systems for phonograph records, tapes, and the like, it will be understood that the invention is by no means limited to this field of application. In radio signalling systems, such as FM systems, for example, it is customary to place a pre-emphasis network between the microphone or other pickup and the modulator, so that the high frequency components of the modulating signals to be transmitted are increased in amplitude relative to the low frequency components, to thereby impart a greater frequency "swing" to the higher frequency components in the transmitted radio wave. The use of pre-emphasis here is analogous to the use of pre-emphasis in recording systems in that both systems are modulating systems and the end result is to obtain a better reproduction of the high frequency components being transmitted or recorded. Accordingly, the automatic filter of the invention may be placed between the microphone or other pickup and the standard 75 microsecond pre-emphasis network of the FM system, to limit the high level, high frequency components of the modulating signal to safe values.

As many changes could be made in the above construction and many apparently widely different embodiments of the invention made without departing from the scope thereof, it is intended that all matter contained in the above description or shown in the accompanying drawings shall be interpreted as illustrative and not in a limiting sense.

What is claimed is:

1. An automatic filter for limiting high amplitude components of a selected range of frequencies of an applied input signal to a desired level, comprising first filter means responsive to said input signal for pre-emphasizing said range of frequencies at a predetermined rate and for attenuating the remaining frequencies of said input signal; second filter means responsive to said input signal for attenuating said range of frequencies and for passing said remaining frequencies of said input signal; limiting means coupled to the output of said first filter means for limiting the amplitude of those components of the pre-emphasized range of frequencies therefrom exceeding a predetermined level; third filter means coupled to the output of said limiting means for de-emphasizing said range of frequencies at said predetermined rate; sharp cut-off filter means coupled to the output of said third filter means for passing said range of frequencies and eliminating spurious frequencies above said range produced by the action of said limiting means; and combining means coupled to the outputs of said second filter means and said sharp cut-off filter means for combining the signals therefrom to recreate said input signal with the high level components of said range of frequencies limited to said desired level.

2. An automatic filter for limiting high amplitude components of a selected range of frequencies of an applied input signal to a desired level, comprising first filter means responsive to said input signal for pre-emphasizing said range of frequencies at a predetermined rate and for attenuating the remaining frequencies of said input signal; second filter means responsive to said input signal for attenuating said range of frequencies and for passing said remaining frequencies of said input signal; limiting means coupled to the output of said first filter means for limiting the amplitude of those components of the pre-emphasized range of frequencies therefrom exceeding a predetermined level; third filter means coupled to the output of said limiting means for de-emphasizing said range of frequencies at said predetermined rate; first sharp cut-off filter means coupled to the output of said third filter means for passing said range of frequencies and eliminating spurious frequencies below said range produced by the action of said limiting means; second sharp cut-off filter means coupled to the output of said first sharp cut-off filter means for passing said range of frequencies and eliminating spurious frequencies above said range produced by the action of said limiting means; and combining means coupled to the outputs of said second filter means and said second sharp cut-off filter means for combining the signals therefrom to recreate said input signal with the high level components of said range of frequencies limited to said desired level.

3. An automatic filter for limiting high amplitude components of a selected range of frequencies of an applied input signal to a desired level, comprising dividing means for dividing said input signal into at least two portions, each having all of the frequencies of said input signal; first filter means coupled to said dividing means to receive one portion of said input signal for pre-emphasizing said range of frequencies at a predetermined rate and for attenuating the remaining frequencies of said input signal; second filter means coupled to said dividing means to receive the other portion of said input signal for attenuating said range of frequencies and for passing said remaining frequencies of said input signal; limiting means coupled to the output of said first filter means for limiting the amplitude of those components of the pre-emphasized range of frequencies therefrom exceeding a predetermined level; third filter means coupled to the output of said limiting means for de-emphasizing said range of frequencies at said predetermined rate; sharp cut-off filter means for passing said range of frequencies and eliminating spurious frequencies outside said range produced by the action of said limiting means; and combining means coupled to the outputs of said second filter means and said sharp cut-off filter means for combining the signals therefrom to recreate said input signal with the high level components of said range of frequencies limited to said desired level.

4. An automatic filter as claimed in claim 3, wherein said limiting means comprises a clipping circuit formed by a pair of oppositely-connected, reversely-biased diodes shunted across the output of said first filter means.

5. An automatic filter as claimed in claim 4, wherein a variable source of bias voltage is provided for said diodes to permit adjustment of the desired limiting level of the high level components of said range of frequencies.

6. An automatic filter for a modulating system of the type using a modulating signal in which the components of a selected range of high frequencies thereof are to be pre-emphasized at a given rate, comprising first high pass equalizer means responsive to an original modulating signal for pre-emphasizing the components of said selected range of high frequencies at substantially the same rate as the pre-emphasis rate to be used by the modulating system, said first high pass equalizer means attenuating the remaining frequencies of the original modulating signal, first low pass equalizer means responsive to the original modulating signal for attenuating the components of said selected range of high frequencies and for passing the components of the remaining frequencies of the original modulating signal, means electrically connected to the output of said first high pass equalizer means for limiting the components of the selected range of high frequencies pre-emphasized by said first high pass equalizer means to a predetermined amplitude level by removing from further processing those portions of the components exceeding said predetermined amplitude level, second low pass equalizer means electrically connected to said limiting means for de-emphasizing the amplitude limited components of said selected range of high frequencies at substantially the same rate as the pre-emphasis rate of said first high-pass equalizer means, and means electrically connected to the outputs of said first and second low pass equalizer means for combining the output signals therefrom to produce a recreated version of the original modulating signal having the amplitude limited components of said selected range of high frequencies produced by said limiting means for use as the modulating signal by the modulating system.

7. An automatic filter as claimed in claim 6, wherein the electrical connection between the output of said second low pass equalizer means and the input of said combining means includes sharp cut-off filter means for passing said selected range of frequencies and eliminating spurious frequencies outside said range produced by the action of said limiting means.

8. In a recording system for phonograph records and the like of the type having high pass equalizer means for pre-emphasizing a selected range of high frequencies of a signal to be recorded, an automatic filter for limiting the components of said selected range of frequencies to a desired amplitude level to prevent overloading and distortion in the system, said filter comprising first high pass equalizer means responsive to an input signal which is to be recorded for pre-emphasizing the components of said selected range of high frequencies at a given rate and for attenuating the lower frequency components of said input signal below said selected range, first low pass equalizer means responsive to said input signal for attenuating the components of said selected range of high frequencies and for passing without substantial attenuation the components of said input signal below said selected range, means electrically connected to the output of said first high pass equalizer means for limiting the components of the selected range of high frequencies pre-emphasized by said first high pass equalizer means to a predetermined amplitude level by removing from further signal processing those portions of the components of said selected range of high frequencies which exceed said predetermined amplitude level, second low pass equalizer means electrically connected to the output of said limiting means for de-emphasizing the remaining amplitude limited components of said selected range of frequencies at substantially the same rate as the said given rate employed by said first high pass equalizer means, and means electrically connected to the outputs of said first and second low pass equalizer means for combining the output signals therefrom to produce a recreated version of the input signal for application to the high pass equalizer means of the recording system, the portions of the components of said selected range of high frequencies removed by said limiting means being absent from the recreated version of the input signal produced by said combining means.

9. An automatic filter as claimed in claim 8, wherein an amplifier is connected between the output of said combining means and the input of the recording system equalizer means to compensate for filter insertion loss.

10. An automatic filter as claimed in claim 8, wherein sharp cut-off filter means are connected between the output of said second low pass equalizer means and the input of said combining means for passing said selected range of frequencies and eliminating spurious frequencies outside said range caused by the action of said limiting means.

11. In a recording system for phonograph records and the like of the type having equalizer means for pre-emphasizing the range of high frequencies of the input signal to be recorded, an automatic filter for limiting the high amplitude components of said range of frequencies to a desired level to prevent over-loading and distortion in the system, said filter comprising voltage divider means for dividing said input signal to be recorded into at least two portions, each having all of the frequencies of said input signal; first high pass filter means coupled to said voltage divider means to receive one portion of said input signal for pre-emphasizing said range of frequencies at substantially the same rate as said equalizer means and for attenuating the lower frequencies of said input signal below said range; first low pass filter means coupled to said voltage divider means to receive the other portion of said input signal for attenuating said range of frequencies and for passing said lower frequencies of the input signal below said range; limiting means comprising a pair of oppositely-connected, reversely-biased diodes shunted across the output of said first high pass filter means for limiting the amplitude of those components of the pre-emphasized range of frequencies therefrom exceeding a predetermined level; second low pass filter means coupled to the output of said limiting means for de-emphasizing said range of frequencies at substantially the same rate as the pre-emphasis rate of said first high pass filter means; sharp cut-off filter means coupled to the output of said second low pass filter means for passing said range of frequencies and eliminating spurious frequencies outside said range produced by said limiting means; and a combining network coupled between the outputs of said first low pass filter means and said sharp cut-off filter means and the input of said equalizer means for combining the signals from said first low pass filter means and said sharp cut-off filter means to recreate said input signal to be recorded with the high level components of said range of frequencies limited to said desired level.

References Cited in the file of this patent

UNITED STATES PATENTS

| | | |
|---|---|---|
| 2,171,671 | Percival | Sept. 5, 1939 |
| 2,458,641 | Rettinger | June 11, 1949 |
| 2,580,052 | Torre | Dec. 25, 1951 |
| 2,686,296 | Olson | Aug. 10, 1954 |
| 2,717,956 | Elgin | Sept. 13, 1955 |
| 2,916,708 | Klie | Dec. 8, 1959 |